US007164618B1

(12) United States Patent
Matthews

(10) Patent No.: US 7,164,618 B1
(45) Date of Patent: Jan. 16, 2007

(54) DUAL UNIT EIDETIC TOPOGRAPHER

(75) Inventor: Anthony Matthews, Panama City Beach, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 163 days.

(21) Appl. No.: 11/094,542

(22) Filed: Mar. 24, 2005

(51) Int. Cl.
*G03B 42/06* (2006.01)
(52) U.S. Cl. ........................................................ 367/11
(58) Field of Classification Search .................. 367/11, 367/88, 99, 118
See application file for complete search history.

(56) References Cited

U.S. PATENT DOCUMENTS 5,231,609 A * 7/1993 Gaer ............................ 367/99

\* cited by examiner

*Primary Examiner*—Dan Pihulic
(74) *Attorney, Agent, or Firm*—James T. Shepherd

(57) ABSTRACT

An underwater detection system that uses two remote vessels in proximity to an object of interest in order to accurately obtain a 3D image of that object. One of the vessels is stationary and includes a first transceiver and a vertical receiving array. The second vessel moves over a predetermined path and uses a transmitter to simultaneously send signals to both the transceiver of the first vessel and the object of interest. The signals are bounced off of the object of interest to the vertical receiving array. Various signals are convoluted to produce an accurate three-dimensional array and thus a three-dimensional image of the object of interest.

13 Claims, 3 Drawing Sheets

DUAL UNIT EIDETIC TOPOGRAPHER

FIELD OF THE INVENTION

The present invention is related in general to underwater sonar detection systems using multiple vessels. In particular, the present invention is directed to a cooperative sonar detection system using two satellite vessels, to obtain data for three dimensional imagery of an object of interest.

BACKGROUND ART

Detection of mines and other objects of interest is a crucial issue for naval security. Accurate detection, often at substantial depths, is also crucial for rescue operations, salvage operations, marine archeology, and marine biology. Unfortunately, many of these endeavors can only be conducted using time-consuming and relatively elaborate techniques.

In the areas of mine detection and rescue operations, time is almost always essential. Not only does the object of interest have to be detected quickly with broad range detection systems, but characteristics of the object must also be ascertained to a high degree of accuracy within a relatively short time span. Broad range detection systems using manned ships and planes are already capable of detecting objects of interest in a large volume of ocean. However, ascertaining the details of the object of interest in a timely fashion is far more problematical.

Manned detection systems in close proximity with an activated object of interest are often endangered due to the characteristics of mines and their self-protection systems. Also, there are problems in dealing with extreme depths. Further, systems that are capable of placing optical detectors near an object of interest often require close human monitoring in nearby vessels. This leads to delays in moving the relatively large vessels to the close proximity of the object of interest, thereby rendering identification of a possible mine or other obstruction to be extremely time-consuming. This is also dangerous for all involved. Likewise, in a search for a crippled submarine over a large volume of ocean, valuable time could be lost while manned ships supporting the necessary detection systems make their way to close proximity with an object of interest.

There are other limitations in the conventional art. For example, a wide aperture sonar array, which is necessary for advanced detecting techniques, is an elaborate physical arrangement. While this is suitable for large vessels, it is almost impossible on small, fast remotely controlled vessels. On the other hand, multi-static synthetic aperture sonar (MSSAS) is generally suitable only when the distances traversed are well delineated and within precise limits. Generally, such systems will not work well, even in close proximity to the object of interest unless all of the operating parameters are carefully laid out, along with the distances to be traversed by the vessel operating a synthetic aperture. This type of operation can be time consuming and awkward. Further, it may overtax the control systems of unmanned satellite vessels that are generally used for this purpose.

In many cases, the time required to obtain detailed data of an object in question is not an issue. Accordingly, many conventional techniques can be used to obtain necessary details by expanding the required time and effort to obtain those details. However, this is a luxury that may often not exist in emergency conditions, or combat conditions, where mines have to be quickly detected and their characteristics identified.

Accordingly, there is an urgent need, especially in military and rescue operations, for a high definition underwater detection and identification system. Such a system must be able to be deployed very quickly and to generate the necessary data in an expeditious manner.

Preferably, the system will be unmanned, but in constant communication with manned vessels so that data uncovered can be incorporated into tactical planning. Further, the desired detection system should work automatically, avoid false alarms, and compensate for bottom topography, as well as for the motion of the water. Since many such systems must be deployed quickly under emergency conditions, the systems will also have to be compact for easy operation in satellite vessels. The system should also be inexpensive so that it can be reasonably deployed in large numbers of small vessels.

SUMMARY OF THE INVENTION

Accordingly, it is one object of the present invention to overcome the drawbacks of the conventional art, and to provide for a clear improvement in operating efficiency over the conventional art.

It is another object of the present invention to provide a system capable of classifying mines and other objects of interest reliably at a safe distance from a manned vessel.

It is a further object of the present invention to provide an underwater detection system capable of using relatively broad high frequency bands to collect three-dimensional imagery of an object of interest.

It is an additional object of the present invention to provide an underwater detection system capable of identification at relatively high speeds appropriate for emergency situations.

It is yet a further object of the present invention to provide an underwater detection system in which large volumes of ocean can be scanned with a high degree of accuracy.

It is again an additional object of the present invention to provide an underwater detection system capable of compensating for irregularities in the ocean floor.

It is still another object of the present invention to provide an underwater detection system capable of compensating for movement of the water in which an object of interest is located.

It is again a further object of the present invention to provide an underwater detection system having a self-calibrating capability in a beam former without the necessity of expensive and elaborate compensating expedients.

It is still an additional object of the present invention to provide an underwater detection system in which compensating factors are easily calculated based upon measurements limited to two cooperating vessels, without involved measurement operations.

It is yet another object of the present invention to provide an underwater detection system operating so as to prevent long-range counter-detection.

It is again a further object of the present invention to provide an underwater detection system capable of providing highly resolved information regarding objects of interest.

It is still an additional object of the present invention to provide an underwater detection system having affordable, assured access to a wide variety of paths or areas in a body of water.

It is again a further object of the present invention to provide an underwater detection system having the capabilities of automatic beam forming and automatic classification of objects of interest.

It is again a further object of the present invention to provide an underwater detection system which can operate effectively in a murky environment.

Still another object of the present invention is to provide an underwater detection system in which the conventional mechanical link between submerged sensors and airborne platforms can be severed.

It is still an additional object of the present invention to provide an underwater detection system having the capability of extended mission times.

It is again another object of the present invention to provide an underwater detection system having the characteristic of reduced acoustic interference.

It is yet a further object of the present invention to provide an underwater detection system having self-calibrating properties of the beam former.

It is still a further object of the present invention to provide an underwater detection system that avoids difficult and expensive attitude measurements, as well as expensive guidance and control packages.

It is yet another object of the present invention to provide a underwater detection system capable of configuring an artificial point target as part of its geometry.

It is again an additional object of the present invention in which high frequency and low frequency operations can co-exist.

It is still a further object of the present invention to provide an underwater detection system that avoids the need to periodically synchronize the clocks of the transmitters and the receivers externally.

It is yet a further object of the present invention to provide an underwater detection system that is practical for deploying large numbers of vessels equipped with the system while maintaining appropriate economies.

It is still an additional object of the present invention to provide an underwater detection system which utilizes the capabilities of real aperture sonar and synthetic aperture sonar.

It is again another object of the present invention to provide an underwater detection system capable of maintaining coherency.

These and other goals and objects of the present invention are achieved by the underwater detection system described herein. For imaging an object of interest, the system includes a first stationary vessel arranged in proximity with the object of interest and having a first transceiver as well as a vertical receiver array. A second vessel is configured to follow a predetermined path with respect to the first vessel, and includes a transmitter arranged to transmit simultaneously to the first transceiver and the object of interest.

The process of operating the system includes a step of calibrating the system by determining time delays of signals from the transceiver to the vertical array. Then, the moving vessel transmits signals to the object of interest, which reflects said signals to the vertical array, while simultaneously transmitting signals directly to said transceiver.

DETAILED DESCRIPTION OF THE PREFERRED EMBODIMENTS

Figure 1:
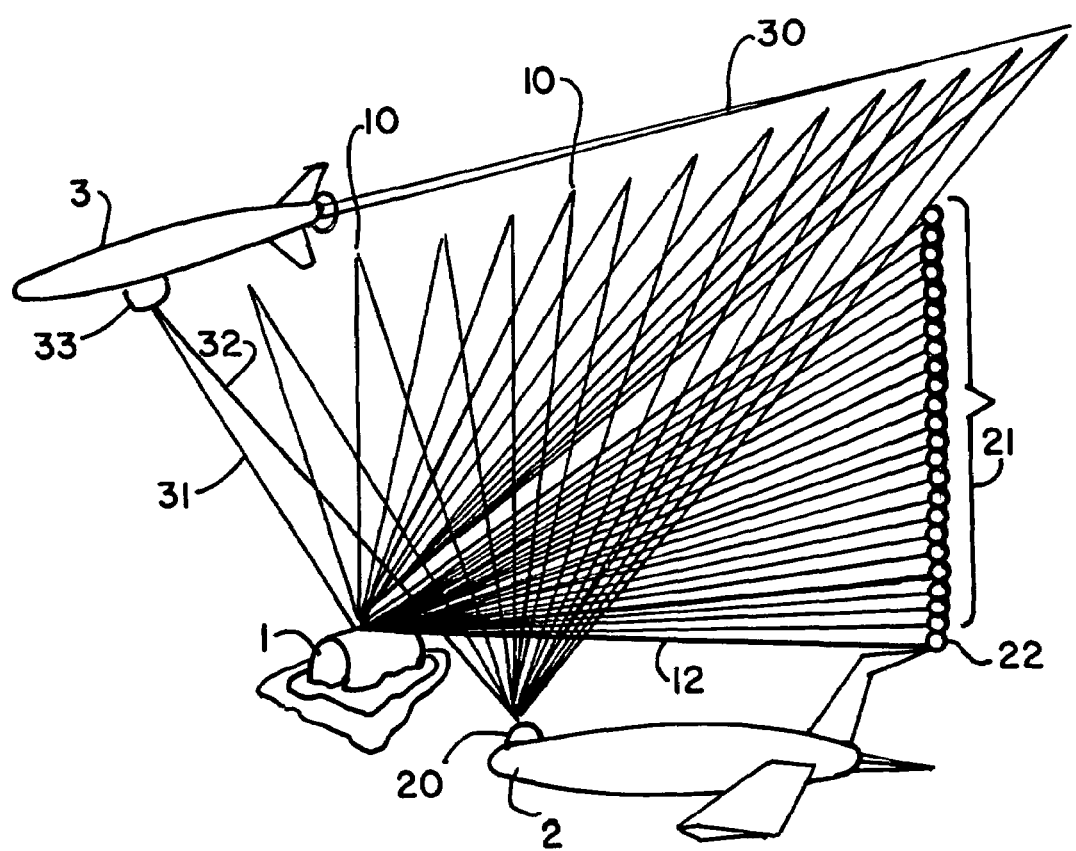
FIG. 1 is a diagrammatic representation of the vessels involved, the object of interest and the transmission paths of the necessary signals.

The present invention is directed to an adjunct for a wide-range of underwater detection systems. In particular, the present invention focuses on the close identification and imaging of a particular object of interest that has already been located by conventional wide-range (generally, low frequency) underwater detection systems.

Once such an object of interest has been located, the present invention is carried out by two, preferably unmanned, satellite vessels. Such vessels are smaller and much less expensive than manned vessels. Further, such unmanned vessels can be deployed in larger numbers, and avoid danger to personnel. Because a substantial number of vessels can be deployed over a wide area, objects of interest can be identified and imaged much more quickly than with more complex conventional systems. This is especially crucial in any situation where time is of the essence, such as combat or rescue operations.

The present invention is utilized in conjunction with a long range, powerful, low frequency sonar, such as SQQ-32 or SQS-53C. Such sonars have an extended range covering a large periphery in which multiple vessels 2, 3 of the present invention linger, covering a wide area of low frequency sonar readings. The low frequency sonar is generally a multistatic sonar operated from a remote manned vessel (not shown). The object of interest 1 is located by the low frequency sonar, which is used to guide high frequency vessel 2 to settle into a stationary position near the object of interest 1.

The low frequency sonar operates from the remote vessel, which is of a size capable of operating in both wide aperture and synthetic aperture formats. The use of these formats allows a wide range of objects to be located over substantial volumes of ocean. However, low frequency sonar is inadequate for imaging or deriving details of the object.

This deficiency is corrected by the high frequency operation of the present invention, as carried out by stationary vessel 2 and moving vessel 3. Vessel 2 must be in reasonably close proximity to object of interest 1 since it is the transceiver 20 of vessel 2 which serves as the point target for the transmissions from transmitter 33 of vessel 3.

It should be understood that the high frequency operation of the present invention is of relatively short range. Accordingly, the two vessels 2 and 3 must be reasonably close to the object of interest 1. It should also be understood that, while the present invention is positioned by an external low frequency sonar system, the present invention can operate independently of such systems in a variety of different applications.

Vessel 2 contains a transceiver 20 and a vertical receiving array 21. This vertical array preferably includes 32 sensors 22, and provides a real vertical aperture for high frequency reception of sonar waves.

Moving vessel 3 contains a transmitter 33 which is configured to send high frequency waves directly to transceiver 20, and to the object of interest 1. Waves are bounced from the object 1 to be received at various sensors 22 of vertical array 21.

The moving vessel 3 moves along a predetermined path 30, in affect serving as a synthetic aperture system by transmitting at various points along path 30. Each of these transmissions points is depicted in FIG. 1. The movement of vessel 3 provides an effective synthetic aperture for the transmission of waves to the object of interest, as well as transceiver 20, while vertical array 21 provides a true receive aperture. This combination is responsible for much of the advantage of the present invention.

The effective synthetic aperture achieved by the moving vessel 3 is based upon its spaced transmissions over a predetermined path 30, which is preferably twice the length of the vertical array.

Because high frequencies are used by vessels 2 and 3, large numbers of such vessel combinations can be used close to each other without interference between the multiple two-vessel units. Separate communications systems, well known in the technology and so not described herein, can be used to send the results of the readings taken by vessels 2 and/or 3, back to the remote vessel which originally located object 1. The signals between the unmanned vessels 2 and 3 and the remote vessel will not be deteriorated by interference since the high frequency signals used by vessels 2 and 3 are quickly extinguished due to absorption losses, while systems such as Com Nav Aid are configured for long range transmission between vessels 2 and 3 and the remote vessel.

A key attribute of the present invention is the self-calibrating property of the beamformer (the transmission array, whether it be synthetic or real aperture).

Normally, there would be problems caused by departures from perfectly vertical by the receiving arrays (such as 21) or from perfect transmitter paths directly over the target (such as path 30 traced by vessel 3). Normally, some kind of compensation would be necessary, and would have to be conventionally derived from expensive attitude measurements, guidance controlling packages and estimates of motions from Doppler indications from all the data taken. Fortunately, compensation coefficients are provided in the process of the present invention as depicted in the flow diagram of FIG. 2.

Figure 2A:
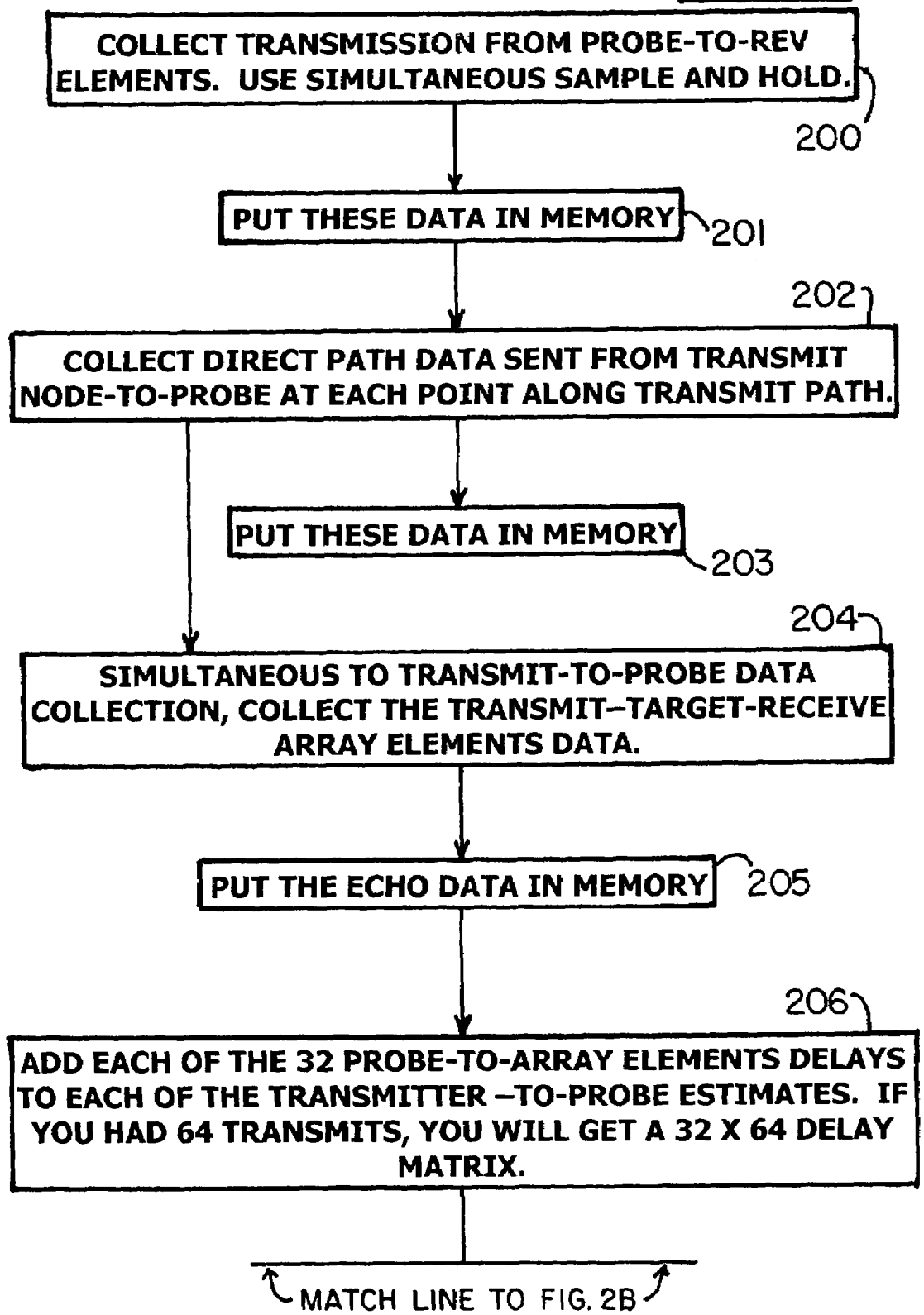
FIG. 2 is a flow diagram describing the sequence of operations carried out by the vessels depicted in FIG. 1.
Figure 2B:
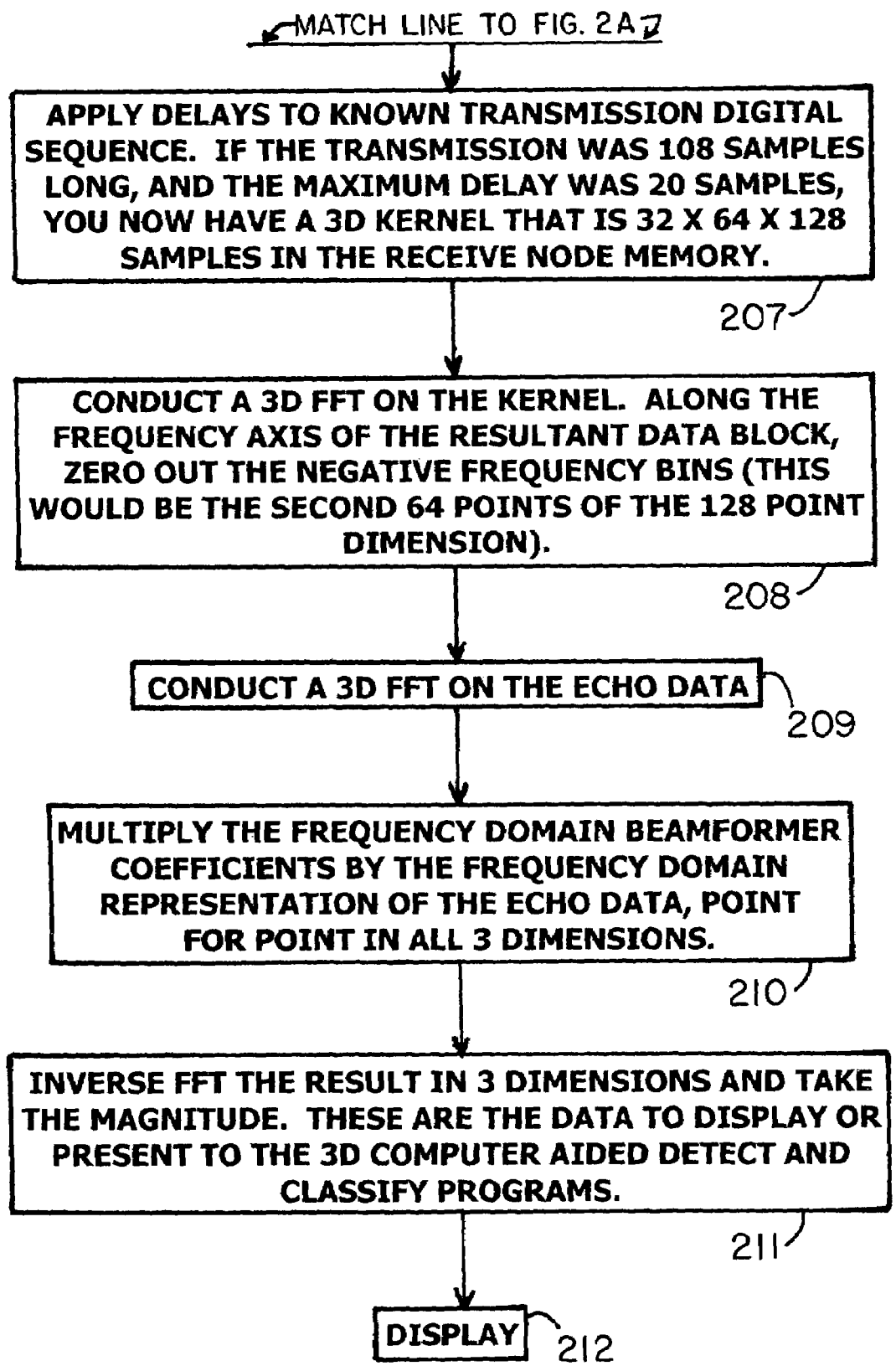

The process of FIG. 2 is not the sole basis for the compensation coefficients. Rather, the use of an artificial point target provides a basis for making the necessary calculations. In the present invention, it is the use of the stationary vessel 2, containing transceiver 20, which serves as the artificial point target.

The process which provides the self-calibration of the present invention is begun at step 200 (in FIG. 2). A single pulse from transceiver 20 is generated, and is received at each of the sensors 22 along array 21. The receiver (not shown) connected to sensor array 21 carries out a simultaneous sample and hold operation for each of the sensors 22. These data samples represent time delays between transceiver 20 and each of the sensors 22 and vertical array 21. As such, this data is put in memory (step 201) to be used in configuring a data matrix, described below.

At step 202 vessel 3 travels along path 30, making transmissions at each point indicated along that path. The data from transmitter 33 is collected at transceiver 20 for each of the points along path 30. Time delayed data derived from the received differences in the signals received for each transmission point is put into memory at step 203. This data is configured in the form of time delays distinguishing a different transmission time from each point along path 30.

At the same time as step 202, signals are sent from transmitter 33 to object 1 and then reflected to vertical array 21 (step 204). This echo data is collected all along the array 21 for each of the sensors 22. The echo data received at the vertical array is configured as delay data and put into memory at step 205. This is done at each of a plurality of selected transmission points 10 along path 30. The time delay data is utilized at step 206 to create a two dimensional matrix. This is done by a calculating or computing device (not shown), which is preferably located in vessel 2. However, the data from vertical sensor array 21 and the transceiver 20 could be transmitted using well known techniques to a manned vessel where the computations could be made. The computing device, wherever it is located, sets up the two dimensional array. For example, for a 32 sensor vertical array, and 64 transmittal points along the path 30, a 32 by 64 matrix of time delay values will be obtained.

At step 207 the original time delay matrix is expanded upon into a three dimensional matrix using the number of transmission samples (each of points 10 along path 30) and the maximum delay along the transmission path 30. In the present example, where the transmission was 108 samples long, and the maximum delay was 20 samples, the $3^{rd}$ dimension of the matrix would have a value of 128 places. This will result in a three dimensional matrix of 32 by 64 by 128 samples in the memory of stationary vessel 2 or any other repository that the data is transmitted to.

At step 208 the computing device conducts a three dimensional Fast Fourier Transform on the three dimensional matrix. This data is manipulated along the frequency axis of the resulting data structure. Negative frequency entries (such as the second 64 points of the 128 dimension) are eliminated.

At steps 209–211 the echo data retained at step 205 is convoluted using the results of the calculation at step 208. Convolution is a well known mathematical process, and is used in the present invention to produce a three dimensional array indicative of the physical details of the object of interest 1. The convolution techniques are discussed in *Digital Signal Processing*, by Allen V. Oppenheim and Ronald W. Schafer, Prentice-Hall, 1975; and *Digital Imaging Processing* by William Pratt, John Wiley and Sons, 1978; and, *Digital Filtering and Signal Processing* by Childers and Durling.

This three-dimensional data can be displayed (step 212) for analysis. This process is begun by conducting a three dimensional Fast Fourier Transform on the echo data from step 205. Then the frequency domain beam former coefficients are multiplied by the frequency domain representation of the echo data (from step 209), point for point for all three dimensions (step 210). Then, at step 211, an inverse Fast Fourier Transform is preformed on the results from step 210, in three dimensions. The magnitude is taken from the resulting matrix, and fed to a 3D, computer-aided detect and classify program so that the data can be displayed to depict the three dimensional characteristics of object 1.

One limitation of the present invention is the necessity of coherency between all of the transmissions and receptions carried out by vessels 2 and 3. This is in part due to the fairly high frequency transmissions which prevent long-range counter-detection, and provide highly resolved data. It would be expensive and awkward to periodically synchronize the clocks of the transmitters 30, 20 and receivers 22 externally. However, the clocks of the present invention operate at the same root frequency before dividing down to the sample frequencies. Using this technique a quasi-coherent system is provided, at least over a short period of time. Accordingly, it is important that the present invention complete its measurement phase before the coherence time of the clocks is exceeded. Both calibrations of the system are inherent in each data production pass. As a result there is no need for expensive motion compensation algorithms or hardware to supply motion estimates for compensation.

It is noted that a straight transmission path 30 is depicted in FIG. 1. However, this is not necessary for the operation of the present invention. Under some circumstances it may not even be optimal for the present invention. The linear course for the transmit mode (from moving vessel 3) may not produce a data set that conforms to an exact convolution. If so, this will limit the focal volume extent when operating in real time (a necessity when dealing in combat and emergency situations). If vessel 3 moves on a circular transmission path over the probe transceiver 20, with the vertical receiver array 21 at the center of the circular area, convolution data acquisition will occur. In some cases, this could serve as an optimal embodiment of the present invention.

The totality of the present invention permits automatic beam forming, which in turn leads to the capability of automatically classifying objects with a high degree of detail, often at extensive ranges from manned vessels. This can be carried out with equipment that is relatively small so that it can be deployed in relatively high numbers, and thereby fully utilize the range of conventional low frequency sonar systems.

The present invention need not be confined to undersea activities. Advances in electronic miniaturization, and even nano-technology can be applied to the present invention. Accordingly, the present invention, when properly miniaturized, can be use in tightly constrained environments including complex fluid systems such as the human body. Properly configured with nano-technology or even standard miniaturized electronics, the present invention can be used to study tiny and virtually inaccessible objects of interest within, e.g., the human body without gross invasive techniques. Conceivably, the present invention can also be applied in fiber optic systems or even magnetic bubble systems. All that is required is the capability to make the vessels with their transceivers and receiving array as small as appropriate for a particular application.

While a number of embodiments have been disclosed by way of example, the present invention is not limited thereto. Rather, the present invention could be construed to include any and all limitations, modifications, permutations, adaptations, variations, derivations and embodiments that would occur to one skilled in this art, once having been taught the present invention. Consequently, the present invention should be limited only by the following claims.

The invention claimed is:

1. An underwater detection system for imaging an object of interest, said detection system comprising:
   (a) a first stationary vessel arranged in proximity with said object of interest, and comprising a first transceiver and a vertical receiver array; and,
   (b) a second moving vessel configured to follow a predetermined path with respect to said first vessel, and comprising a transmitter arranged to transmit simultaneously to said first transceiver and said object of interest.

2. The detection system of claim 1, further comprising:
   (a) calculating means for combining data from signals: transmitted directly from said transmitter to said vertical receiver array and signals reflected from said object of interest to said vertical receiver array, to derive image details of said object of interest.

3. The detection system of claim 2, wherein said vertical receiver array comprises 32 sensors.

4. The detection system of claim 2, wherein said predetermined path is substantially twice the length of said vertical receiver array.

5. The detection system of claim 2, wherein said calculating means comprise means for conducting a Fast Fourier Transform on said data.

6. The detection system of claim 5, wherein said system operates throughout the range of sonar frequencies.

7. The detection system of claim 5, wherein said transceiver, said vertical receiver array and said transmitter operate using a common clock frequency.

8. A process of operating an underwater detection system for imaging an object of interest, where said system includes a first stationary vessel having a transceiver and a vertical receiver array, and a second moving vessel having a transmitter, said process comprising the steps of:
   (a) calibrating said system by determining time delays of signals from said transceiver to said vertical array; and, simultaneously transmitting first signals from said moving vessel to an object of interest, reflecting said first signals to said vertical array, and transmitting second signals directly to said transceiver.

9. The process of claim 8, further comprising the steps of:
   (a) combining said delays in a matrix;
   (b) modifying said matrix based upon length of transmission path;
   (c) convoluting said matrix; and
   (d) displaying image data of said object of interest.

10. The process of claim 9, wherein said moving vessel sends transmission signals over a path having a length equal to twice the length of said vertical array.

11. The process of claim 9, wherein said transceiver, said vertical receiver array and said transmitter operate using a common root clock frequency.

12. The process of claim 11, wherein said process takes place in a time frame appropriate to maintain frequency and timing coherence between said transceiver, said vertical receiver array and said transmitter.

13. The process of claim 12, wherein said moving vessel travels in a semi-circular path.

* * * * *